(12) United States Patent
Lecomte

(10) Patent No.: US 9,000,055 B2
(45) Date of Patent: Apr. 7, 2015

(54) PROCESS FOR PRODUCING SYNTHETIC HYDROCARBONS FROM CARBONACEOUS MATERIALS

(75) Inventor: Michel Lecomte, Rueil Malmaison (FR)

(73) Assignee: Areva, Paris (FR)

(*) Notice: Subject to any disclaimer, the term of this patent is extended or adjusted under 35 U.S.C. 154(b) by 559 days.

(21) Appl. No.: 13/383,152

(22) PCT Filed: Jul. 7, 2010

(86) PCT No.: PCT/FR2010/051436
§ 371 (c)(1),
(2), (4) Date: Mar. 23, 2012

(87) PCT Pub. No.: WO2011/004122
PCT Pub. Date: Jan. 13, 2011

(65) Prior Publication Data
US 2012/0172460 A1     Jul. 5, 2012

(30) Foreign Application Priority Data
Jul. 9, 2009   (FR) ..................... 09 54763

(51) Int. Cl.
C07C 27/00 (2006.01)
C01B 3/12 (2006.01)
C10G 2/00 (2006.01)
C10J 3/00 (2006.01)
C10J 3/72 (2006.01)
C10K 1/00 (2006.01)
C10K 3/02 (2006.01)
C10K 3/04 (2006.01)

(52) U.S. Cl.
CPC ... *C01B 3/12* (2013.01); *C10G 2/30* (2013.01); *C10J 3/00* (2013.01); *C10J 3/721* (2013.01); *C10K 1/005* (2013.01); *C10K 3/026* (2013.01); *C10K 3/04* (2013.01); *C01B 2203/0475* (2013.01); *C01B 2203/062* (2013.01); *Y02E 60/364* (2013.01); *C10J 2300/0959* (2013.01); *C10J 2300/1659* (2013.01); *C10J 2300/1684* (2013.01)

(58) Field of Classification Search
USPC .................................................. 518/700, 702
See application file for complete search history.

(56) References Cited

U.S. PATENT DOCUMENTS

2009/0299795 A1* 12/2009 Khan et al. .................... 705/8
2010/0177861 A1    7/2010 Lecomte et al.

FOREIGN PATENT DOCUMENTS

DE          203 20 020 U1    5/2004
WO    WO 2006/099573 A1    9/2006
WO    WO 2007/108014 A1    9/2007

* cited by examiner

*Primary Examiner* — Jafar Parsa
(74) *Attorney, Agent, or Firm* — Davidson, Davidson & Kappel, LLC

(57) ABSTRACT

A method for producing synthetic hydrocarbons from at least one carbonaceous material is provided. The method includes evaluating the resources of the carbonaceous material available on a determined territory; determining from the resources a total production capacity of synthetic hydrocarbons; determining from the total production capacity, a number of elementary production units required for obtaining the total production capacity, each elementary production unit having an elementary production capacity between a 100 and a 1,000 barrels a day of synthetic hydrocarbons; building the number of elementary production units on the territory; transporting the carbonaceous material from the territory as far as the elementary production units; producing the synthetic hydrocarbons in the elementary production units from the transported carbonaceous material.

12 Claims, 5 Drawing Sheets

PROCESS FOR PRODUCING SYNTHETIC HYDROCARBONS FROM CARBONACEOUS MATERIALS

The present invention generally refers to methods for producing synthetic hydrocarbons from carbonaceous materials.

BACKGROUND

The methods known to this day for producing synthetic hydrocarbons from carbonaceous materials are applied in large capacity installations, for example having production capacities of 10,000 or 20,000 barrels of hydrocarbons a day.

Such units have to be set up close to a very large source of carbonaceous materials, or have to be supplied from many smaller sources distributed over a large territory.

There are not many large sources. Moreover, when the supply is accomplished from many sources distributed over a large territory, certain sources are necessarily remote. Supplying the installation for producing synthetic hydrocarbons then requires many transports, which are costly in energy.

SUMMARY OF THE INVENTION

An object of the invention is to provide a method for producing synthetic hydrocarbons which may be applied inter alia far from large sources of carbonaceous materials, with a low energy cost for the supply.

A method for producing synthetic hydrocarbons from at least one carbonaceous material is provided. The method includes the following steps:

evaluating the available resources of said carbonaceous material on a determined territory;
determining from said resources a total production capacity of synthetic hydrocarbons;
determining from the total production capacity, a number of elementary production units required for obtaining the total production capacity, each elementary production unit having an elementary production capacity comprised between 100 and a 1,000 barrels a day of synthetic hydrocarbons;
building said number of elementary production units on said territory;
transporting the carbonaceous material from the territory to the elementary production units;
producing the synthetic hydrocarbons in elementary production units from the transported carbonaceous material.

The method may also have one or more features below, considered individually or according to all the technically possible combinations:

the territory has a surface area of less than 10 000 km$^2$;
the resources of said carbonaceous material stem from a plurality of localized sources, the elementary production units being built on a same site, said site being at a distance of less than 200 km from each of the sources of said carbonaceous material;
the resources of said carbonaceous material stem from a plurality of localized sources, the elementary production units being built on a same site, said site being selected so that the average distance of said sources of carbonaceous material from said site is less than 100 km ;
each elementary production unit has an elementary production capacity comprised between 100 and 500 barrels a day of synthetic hydrocarbons;

each elementary production unit comprises:
a module for producing a first gas stream comprising at least carbon monoxide and carbon dioxide from the carbonaceous material.
a module for converting at least one portion of the carbon dioxide of the first gas stream into carbon monoxide.
a module for producing at least one first stream of synthetic hydrocarbons at least from carbon monoxide of the first gas stream and from carbon monoxide from the conversion module.
an electrolyzer capable of providing hydrogen to the conversion module and to the module for producing the first stream of hydrocarbons and optionally oxygen to the module for producing the first gas stream;
the conversion module and the module for producing the first stream of synthetic hydrocarbons are dedicated to the corresponding elementary production unit;
the module for producing the first gas stream is dedicated to the corresponding elementary production unit;
the module for producing the first gas stream is common to at least two elementary production units;
each elementary production unit comprises a post-treatment module provided for producing at least one second stream of synthetic hydrocarbons from the first stream of synthetic hydrocarbons, the post-treatment module being dedicated to the corresponding elementary production unit;
each elementary production unit comprises a post-treatment module provided for producing at least one second stream of synthetic hydrocarbons from the first stream of synthetic hydrocarbons, the post-treatment module being common to at least two elementary production units;
the electrolyzer is dedicated to the corresponding elementary production unit;
the electrolyzers of the elementary production units are supplied with electricity from an electric power distribution network serving at least one electricity consumer other than the elementary production units, the method including the following steps:
evaluating the available electric power on the electric power distribution network;
withdrawing at least partially at least one elementary production unit from the electricity network according to the available power.

BRIEF DESCRIPTION OF THE DRAWINGS

Other features and advantages of the invention will become apparent from the detailed description which is given below, as an indication and by no means as a limitation, with reference to the appended figures, wherein.

DETAILED DESCRIPTION

Figure 1:
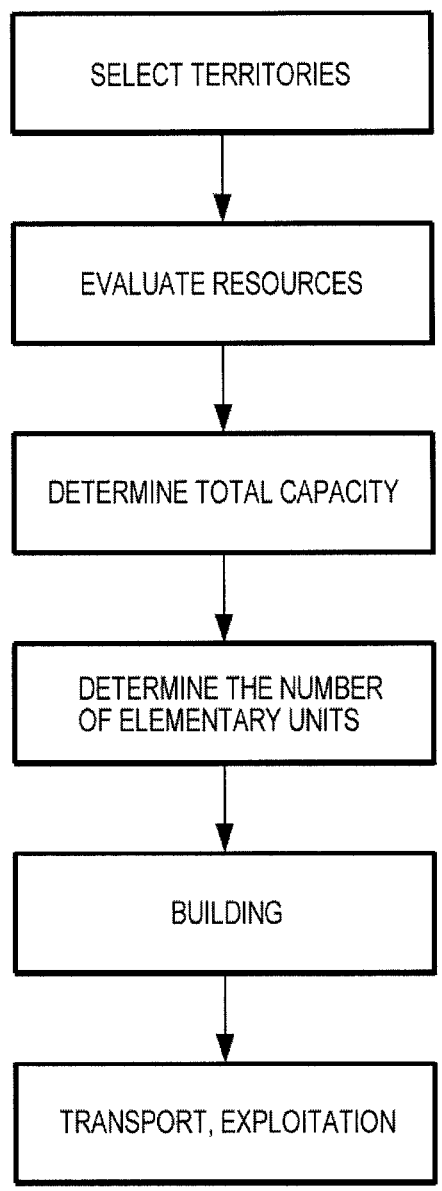
FIG. 1 is a diagram of steps showing the main steps of a method according to an embodiment of the invention.

The schematically illustrated process in FIG. 1 aims at optimizing the production of synthetic hydrocarbons from carbonaceous material in a geographical area, and notably aims at optimizing the logistic operations for the carbonaceous material supply of the production installations.

The method includes the following steps:
- selecting, within the relevant geographical area, one or more territories intended to provide the carbonaceous material;
- evaluating the resources of said carbonaceous material available on each territory;
- determining from said evaluated resources, a total production capacity of synthetic hydrocarbons;
- determining from the total production capacity, a required number of elementary production units for obtaining the total production capacity, each elementary production unit having an elementary production capacity comprised between 100 and 1000 barrels a day of synthetic hydrocarbons;
- selecting, in each relevant territory, the site for building the elementary production units;
- building the determined number of elementary production units on the retained site for each territory;
- transporting the carbonaceous material from the territory as far as the elementary production units;
- producing the synthetic hydrocarbons in the elementary production units from the transported carbonaceous material.

The geographic area considered in the present process may be an entire country. It may be, as illustrated in FIG. 2, a country such as France.

The relevant geographical area may also be only a portion of a country or on the contrary it may encompass several countries of small sizes.

Figure 2:
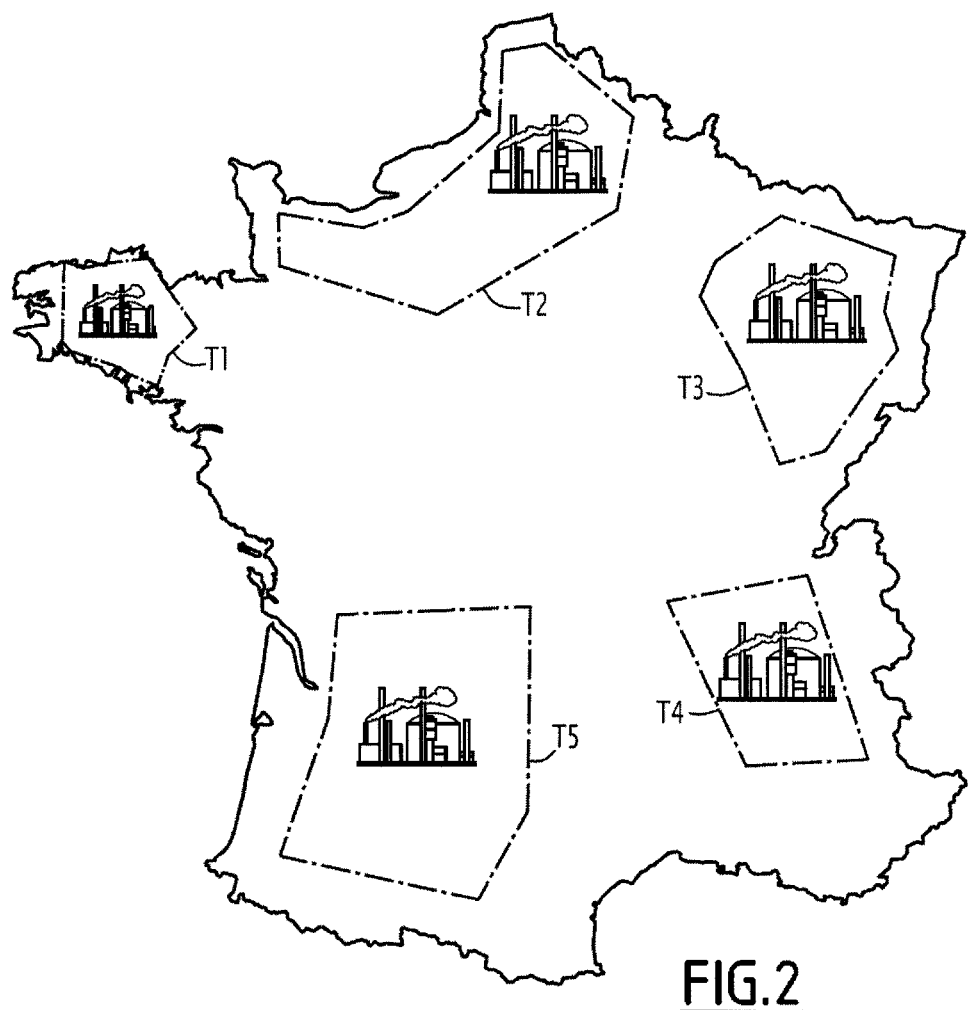
FIG. 2 is a schematic illustration of the relevant territories for the method of FIG. 1.

Within the relevant geographical area, territories are selected for providing a carbonaceous material, for example the territories T1 to T5 in FIG. 2. An installation for producing a synthetic hydrocarbon will be installed on each territory. These territories may be selected on the basis of the following criteria:
- a surface area of less than 10,000 km$^2$;
- carbonaceous material resources available on the territory greater than an equivalent of 300,000 tons of dry biomass per year.

Generally, the sources of carbonaceous materials are of two kinds:
- non-renewable carbon sources for example of the coal type, combustion fumes of blast furnaces or cement works,
- the renewable carbon sources for example of the type: plant waste, animal waste, organic portion of sorted out municipal waste etc. . . .

The non-renewable carbon sources are generally concentrated (mines, factories). On the other hand, renewable carbon sources are seldom concentrated, they are rather distributed over the territory.

In the present process, renewable carbon sources are more particularly considered.

The carbonaceous material may therefore comprise one or more of the following elements:
- municipal waste,
- animal waste,
- biomass,
- plastic materials such as polyethylene, . . . etc In order to reduce transports between carbonaceous material sources and the installation for producing synthetic hydrocarbons, it is important that the relevant territory be not too large and that this territory have sufficient resources of carbonaceous material.

Figure 3:
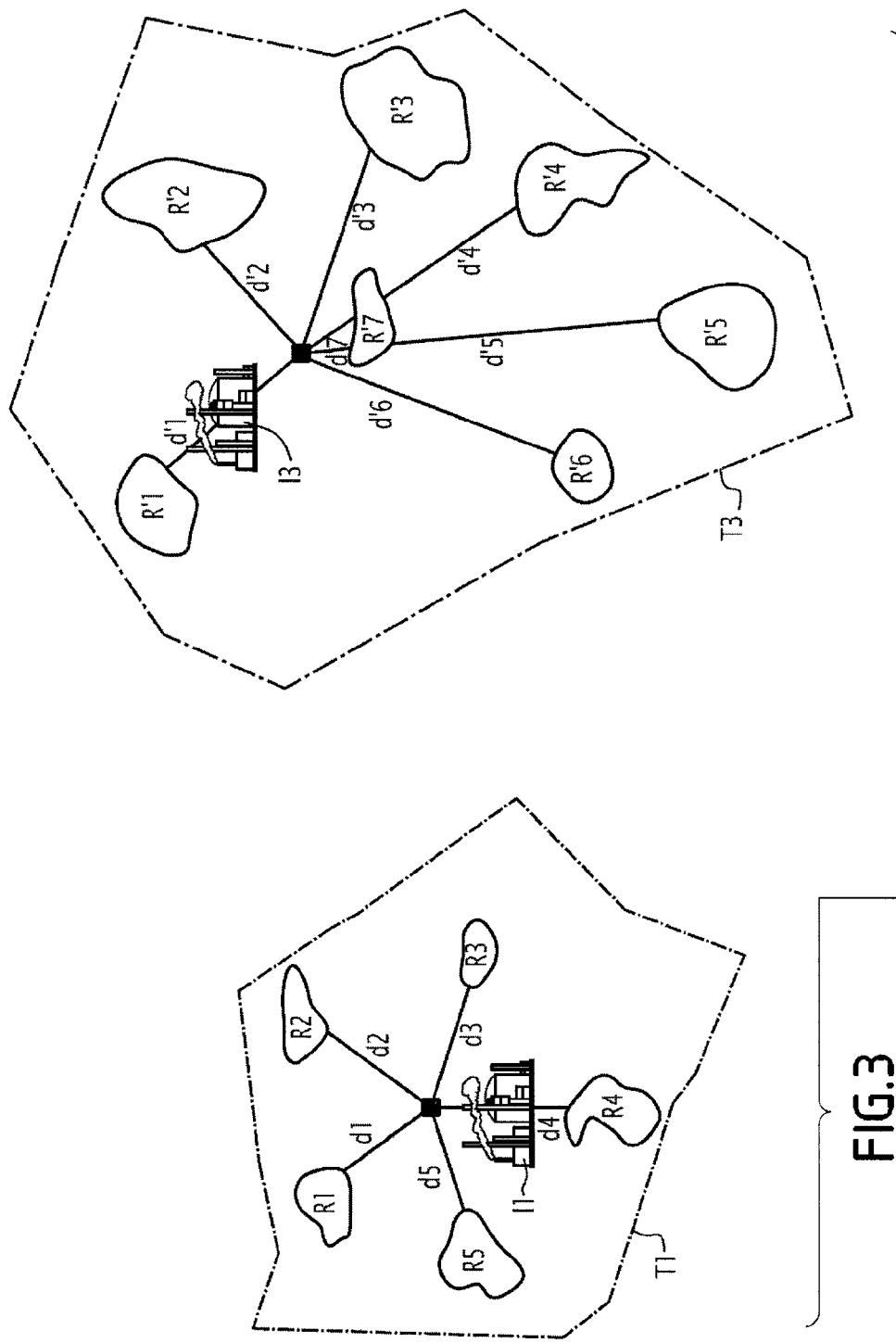
FIG. 3 is a schematic illustration of the sources of carbonaceous material in certain territories of FIG. 2.

For each thereby selected territory, the available carbonaceous material resources are evaluated. To do this, as illustrated in FIG. 3, one or more carbonaceous material sources are identified in each territory, noted as R1 to R5 and R'1 to R'7 for both territories T1 and T3 of FIG. 3. For each source, the amount of carbonaceous material which may be provided to the installation for producing a synthetic hydrocarbon is evaluated. This amount is for example a flow, in tons of carbon per year.

In the following step, the total synthetic hydrocarbon production capacity which may be obtained from the resources of each territory, is determined. This operation is a standard dimensioning operation, which will not be detailed here. It will only be specified that the total production capacity depends on the nature of the synthetic hydrocarbons to be produced and on the retained production process. Synthetic hydrocarbons may be selected so that the installation essentially produces diesel oil, and/or kerosene, and/or any other type of hydrocarbon which may be contemplated.

In the next step, the number of elementary production units which are necessary to apply in order to obtain said total production capacity is determined from the total production capacity for each territory.

The elementary production units are standardized units, all identical with each other, having the same elementary production capacity. Only the module for preparing the raw material depends on the nature of the latter.

The elementary production capacity is typically comprised between 100 and 1,000 barrels a day of synthetic hydrocarbons, and is typically comprised between 100 and 500 barrels a day of synthetic hydrocarbons. Each elementary production unit therefore has a low production capacity with respect to the installations known to this day for making synthetic hydrocarbons.

Figure 4:
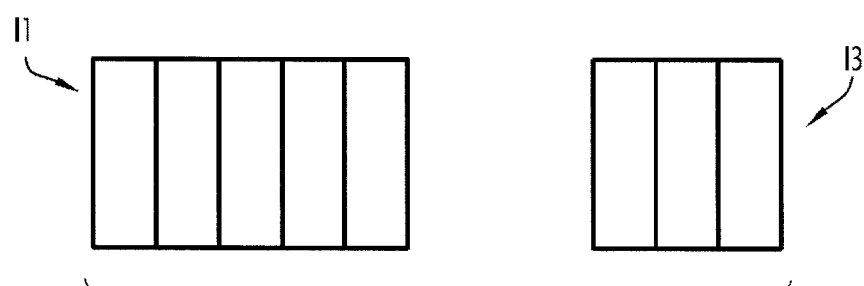
FIG. 4 is a schematic illustration of the installations for producing synthetic hydrocarbons of the territories of FIG. 3, showing that each installation consists of several modules.

Thus, in the method of the invention, a number of elementary production units are built on each territory, which may be different and which depends on the carbonaceous material resources available on said territory. As illustrated in FIG. 4, the installation I1 for producing synthetic hydrocarbons for territory T1 may comprise five elementary production units, while the installation I3 for synthetic hydrocarbons for territory T3 only includes three elementary production units. In FIG. 4, each elementary production unit is illustrated as a rectangle.

Each installation for producing synthetic hydrocarbons typically includes between 1 and 20 elementary production units, typically between 1 and 10 elementary production units.

In the next step, the site for building the installation for producing synthetic hydrocarbons is selected for each territory. All the elementary production units for a same installation are built on the same site.

Preferably, the site is selected so that all the carbonaceous material sources are at a distance of less than 200 km from the site. Preferably, the site is selected so that the distance between said site and each carbonaceous material source is less than 100 km.

Alternatively, the site is selected so that the average distance between the site and the carbonaceous material sources is less than 100 km, preferably less than 50 km.

The distance between the site and a given source of carbonaceous material may be calculated in multiple ways, notably depending on the nature of the source. If the source is localized, for example in the case of municipal waste stemming from a waste sorting workshop, the retained distance will correspond to the distance between the sorting workshop and the site. If the source is geographically extended, for example in the case of biomass produced in several fields distributed over a certain surface area, the distance between the geographical center of said surface area and the site may for example be considered. The distances may be calculated in multiple other ways which will not be detailed here.

Once the site is selected for each territory, the determined number of elementary production units are built on said site, and this for each territory.

The exploitation of the installation of each territory is carried out by transporting the carbonaceous material from the different sources of said territory as far as the elementary production units, and while producing synthetic hydrocarbons in the different elementary production units from the transported carbonaceous material. The synthetic hydrocarbons are then distributed. They may be distributed only on the corresponding territory or on the contrary be distributed over a wider geographical area.

Figure 5:
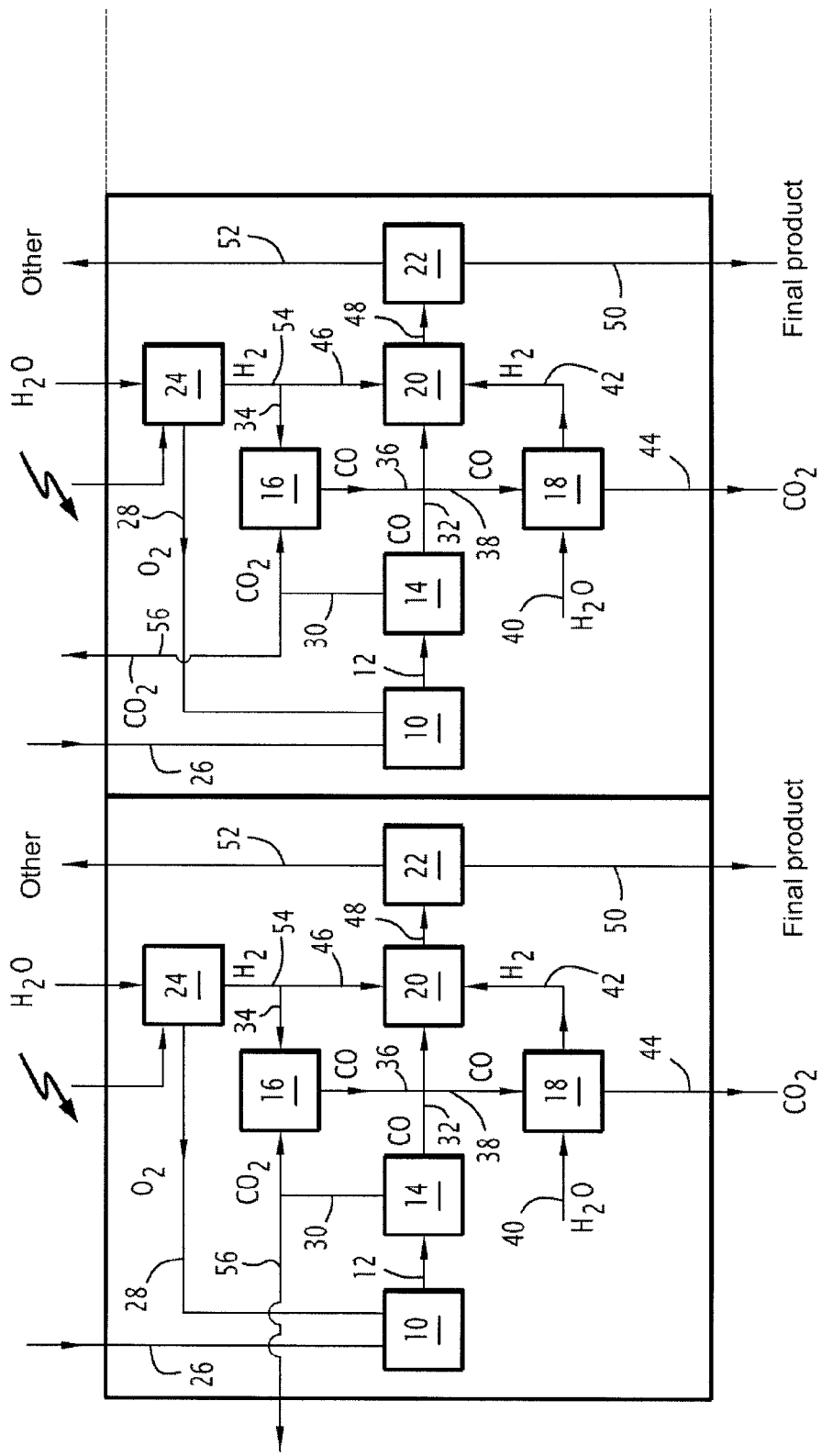
FIG. 5 is a schematic illustration of the modules of the installations of FIG. 4, for a first embodiment of the invention.

In a first embodiment of the invention, illustrated in FIG. 5, each elementary production unit is practically entirely independent of the other elementary production units of the same installation. For example, each elementary production unit is of the type described in U.S. Patent Pub. No. 2010/0177861. Alternatively, each elementary production unit may be as shown in FIG. 5, include the following modules:

- a module 10 for producing a first gas stream 12 from the carbonaceous material, the first gas stream comprising at least carbon monoxide and carbon dioxide;
- a module 14 for conditioning the first gas stream 12, provided for separating the carbon monoxide and the carbon dioxide in the first gas stream from the other possible gases;
- a module 16 for converting carbon dioxide into carbon monoxide;
- a module 18 for converting carbon monoxide into carbon dioxide;
- a module 20 for producing a first stream of synthetic hydrocarbons from carbon monoxide;
- a post-treatment module 22 provided for producing a second stream of synthetic hydrocarbons from the first stream of synthetic hydrocarbons;
- an electrolyzer 24.

Each of the modules 10, 14, 16, 18, 20, 22 as well as the electrolyzer 24 is dedicated to the corresponding elementary production unit. In other words, each elementary production unit includes modules 10, 14, 15, 18, 20, 22 and an electrolyzer 24 which is specific to it.

The module 10 for producing the first gas stream is for example a gasifier. The gasifier may be of the type with partial oxidation or a vapor gasifier or a gasifier applying both methods combined (of the POS type). The module 10 is fed with carbonaceous material through line 26 and with oxygen from the electrolyzer 24 through line 28.

The conditioning module 14 separates the first gas stream into two streams, a second gas stream 30 comprising in majority $CO_2$ and a third gas stream 32 comprising in majority CO. This conditioning module is of a known type, and will not be described in more detail here.

The conversion module 16 is of the RWGS (Reverse Water Gas Shift) type. It is fed with $CO_2$ through line 30 and with hydrogen from the electrolyzer 24, through line 34. In the conversion module 16, $CO_2$ is converted into CO according to the general chemical equation:

$$CO_2 + H_2 \rightarrow CO + H_2O$$

The water is for example recycled into the electrolyzer 24. The CO leaves the conversion module through line 36.

The module 18 for converting CO into $CO_2$ is for example of the WGS (Water Gas Shift) type. It is fed with CO coming from the module for conditioning the gases 14 through line 38. Line 38 is mounted as a bypass of line 32. The conversion module 18 is also fed with water through line 40. Water comes from the outside of the module 18. The conversion module 18 allows conversion of CO into $CO_2$ according to the following general chemical equation:

$$CO + H_2O \rightarrow H_2 + CO_2$$

$H_2$ leaves the conversion module 18 through line 42. $CO_2$ leaves the conversion module 18 through line 44.

$CO_2$ leaving the module 18 through line 44 is released into the atmosphere or stored in any form, either as a gas or as a liquid.

The module 20 for producing the first stream of synthetic hydrocarbons for example operates according to the Fischer-Tropsch process. This process is known and will not be detailed here. The module 20 is fed with CO through line 32. It also receives CO from line 36, this line directly feeding the module 20 or feeding the module 20 via the line 32, as illustrated in FIG. 5. The module 20 is also fed with hydrogen $H_2$. It receives hydrogen $H_2$ from the electrolyzer 24 through line 46. It also receives hydrogen from line 42, stemming from the conversion module 18.

In the production module 20, the carbon monoxide and hydrogen react on catalysts and form a large number of synthetic hydrocarbons. This first stream of synthetic hydrocarbons leaves the production module 20 through line 48.

The post-treatment module 22 produces from the first stream of synthetic hydrocarbons a second stream of synthetic hydrocarbons and a third stream of synthetic hydrocarbons. The module 22 is a refining unit of a type known per se in the petroleum domain. The second stream for example corresponds to the final product of the production installation. This second stream is therefore for example diesel fuel or kerosene, . . . etc. The third stream for example corresponds to the byproducts of the module 22 other than the final sought product. For example it comprises naphthas or any other type of product.

The second stream of synthetic hydrocarbons leaves the module 22 through line 50 and the third stream through line 52.

The second and the third streams are collected in storage tanks or may be recycled into the installation.

The electrolysis unit 24 of a type known per se is provided in order to produce oxygen and hydrogen from water and electricity provided by the local electricity distribution network. Oxygen leaves the electrolyzer through line 28 and hydrogen though line 54.

The elementary production unit also includes controllers for controlling the different modules 10, 14, 16, 18, 20 and 22 and for driving the electrolyzer 24. The controllers are notably provided for selectively distributing the hydrogen stream leaving the electrolyzer through line 54 between lines 34 and 46. The controllers are moreover provided for selectively distributing the CO stream leaving the module for conditioning the gases 14 towards the production module 20 and/or the conversion module 18.

Controlling of the production unit may for example be carried out in the following way. When electricity is abundantly available on the network, the controllers directs all the CO leaving the module 14 towards the production module 20. The conversion module 18 is therefore at a standstill. Moreover, the electrolyzer is used so as to produce a large amount of hydrogen partly directed towards the conversion module 16 and partly towards the production module 20.

On the contrary, when electricity is only available in a small amount on the network, the controllers direct a portion of the CO flowing out of the conditioning module 14 towards the conversion module 18 and a portion of CO towards the production module 20. On the other hand, the conversion module 16 is stopped. All the hydrogen leaving the electrolyzer 24 is directed towards the production module 20 through line 46. The electrolyzer operates at low capacity and produces a smaller amount of hydrogen than in the first case. The $CO_2$ separated in the unit for conditioning the gases 14 is directed towards the outside of the elementary production unit via line 56.

A second embodiment of the invention will now be described, with reference to FIG. 6. Only the points via which the second embodiment differs from the first will be detailed below. Identical elements for providing the same function in both embodiments will be designated with the same references.

The process applied in each elementary production unit for the second embodiment is substantially identical with that applied for the first embodiment of the invention. On the other hand, certain modules are common to several elementary production units and are therefore no longer dedicated to a determined unit, as in the first embodiment.

Figure 6:
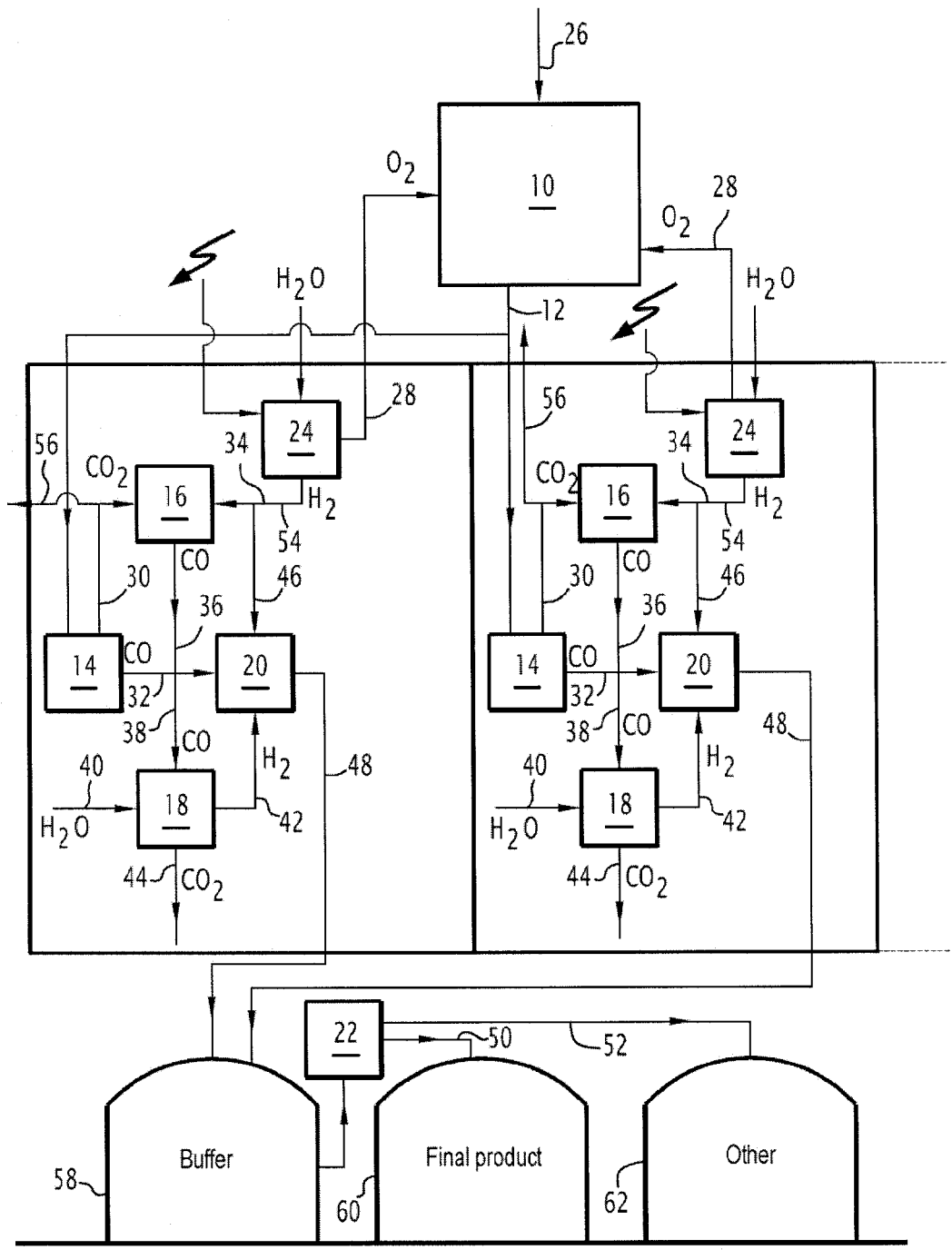
FIG. 6 is a schematic illustration similar to the one of FIG. 5, for a second embodiment of the invention.

As shown in FIG. 6, the module 10 for producing the first gas stream is common to at least two elementary production units. It may be common to several elementary production units, or even be common to all the elementary production units. The first gas stream is distributed among the different elementary production units sharing the production module 10.

The post-treatment module 22 is also shared among several elementary production units. It may be common to two elementary production units, or even three, to all the elementary production units. As this is visible in FIG. 6, the first stream of synthetic hydrocarbons 48 produced by each of the elementary production units is collected in a buffer storage 58, for example in a set of storage tanks. The post-treatment module 22 is fed from this storage buffer 58. The second stream of synthetic hydrocarbons 50, containing the final product is collected at the outlet of the post-treatment module 22 in a storage 60. Also, the third stream of synthetic hydrocarbons 52 for example comprising the other hydrocarbons is connected at the outlet of the post-treatment module 22 in a storage unit 62.

The production method described above has multiple advantages.

Because this method is based on the use of several units with a capacity comprised between a 100 and a 1000 barrels a day, in a determined number depending on the resources of the relevant territory, it is possible to apply the method far away from large sources of carbonaceous material, on territories with limited size and each having limited total resources.

The method is particularly suitable for territories of small surface areas. It allows placement of the building site for producing synthetic hydrocarbons at a moderate distance from the sources of carbonaceous material of the territory.

The transports required for conveying the carbonaceous material as far as the installation for producing synthetic hydrocarbons are accomplished over short distances, which allows limitation of the fuel consumption related to this transport as well as $CO_2$ emissions.

Also, the transports with view to distributing the final product are also achieved over limited distances, which allows fuel to be saved and $CO_2$ emissions to be limited.

Moreover, the installation is designed so as to be able to withdraw at least partially with regard to the electricity distribution network. This partial withdrawal is achieved by stopping one or several elementary production units. The withdrawal may also be achieved by using the unit 18 for converting CO into $CO_2$, which allows production of hydrogen from carbon monoxide. Relief is thus provided to the electrolyzer 24, for which the electricity consumption and the production of hydrogen may be decreased accordingly. This also facilitates the management of the electricity network at a local level, by making the electricity demand quasi-constant locally. This operating flexibility gives the possibility of making the most out of attractive rates on electricity by adapting the production load of the installation according to the price of electricity.

Moreover, the use of all identical standardized elementary production units allows reduction in the building and maintenance costs of these units by a series effect, and therefore reduction of the costs for producing synthetic hydrocarbons.

The method for producing synthetic hydrocarbons described above may have multiple alternatives.

Each elementary production unit may apply a method for synthesizing hydrocarbons, different from the Fischer-Tropsch process. For example it may apply a process known under the acronym of MTG (Methanol To Gasoline).

The modules either common or dedicated to the different elementary production units may be different from what is illustrated in FIG. 6. For example, the module 10 for producing the first gas stream may be common while the post-treatment module 22 may be dedicated or visa versa. Moreover the electrolyzer 24 may be common, or any other module.

The invention claimed is:

1. A method for producing synthetic hydrocarbons from at least one carbonaceous material, the method comprising:
    evaluating resources of the carbonaceous material available on a determined territory;
    determining from the resources a total production capacity of synthetic hydrocarbons;
    determining from the total production capacity, a number of elementary production units required for obtaining the total production capacity, each elementary production unit having an elementary production capacity comprised between a 100 and a 1,000 barrels a day of synthetic hydrocarbons;
    building the number of elementary production units on the territory, each elementary production unit including:
        a module for producing a first gas stream comprising at least carbon monoxide and carbon dioxide from the carbonaceous material;
        a module for converting at least one portion of the carbon dioxide of the first gas stream into carbon monoxide;
        a module for producing at least a first stream of synthetic hydrocarbons at least from carbon monoxide of the first gas stream and from carbon monoxide stemming from the conversion module; and
        an electrolyzer capable of providing hydrogen to the conversion module and to the module for producing the first stream of hydrocarbons;
    transporting the carbonaceous material from the territory to the elementary production units;
    producing synthetic hydrocarbons in the elementary production units from the transported carbonaceous material,
    the electrolyzers of the elementary production units being supplied with electricit from an electricity distribution network serving at least one electricity consumer other than the elementary production units;

evaluating the electric power available on the electricity distribution network; and withdrawing at least partly at least one elementary production unit from the electricity distribution network according to the available power.

2. The method as recited in claim 1 wherein the territory has a surface area of less than 10,000 km$^2$.

3. The method as recited in claim 1 wherein the resources of the carbonaceous material stem from a plurality of localized sources, the elementary production units being built on a same site, the site being at a distance of less than 200 km from each of the sources of the carbonaceous material.

4. The method as recited in claim 1 wherein the resources of the carbonaceous material stem from a plurality of localized sources, the elementary production units being built on a same site, the site being selected so that the average distance of the sources of carbonaceous material from the site is less than 100 km.

5. The method as recited in claim 1 wherein each elementary production unit has an elementary production capacity comprised between a 100 and 500 barrels a day of synthetic hydrocarbons.

6. The method as recited in claim 1 wherein the electrolyzer is capable of providing oxygen to the module for producing the first gas stream.

7. The method as recited in claim 1 wherein the conversion module and the module for producing the first stream of synthetic hydrocarbons are dedicated to the corresponding elementary production unit.

8. The method as recited in claim 1 wherein the module for producing the first gas stream is dedicated to the corresponding elementary production unit.

9. The method as recited in claim 1 wherein the module for producing the first gas stream is common to at least two elementary production units.

10. The method as recited in claim 1 wherein each elementary production unit comprises a post-treatment module provided for producing at least one second stream of synthetic hydrocarbons from the first stream of synthetic hydrocarbons, the post-treatment module being dedicated to the corresponding elementary production unit.

11. The method as recited in claim 1 wherein each elementary production unit comprises a post-treatment module provided for producing at least one second stream of synthetic hydrocarbons form the first stream of synthetic hydrocarbons, the post-treatment module being common to at least two elementary production units.

12. The method as recited in claim 1 wherein the electrolyzer is dedicated to the corresponding elementary production unit.

* * * * *